3,594,378
THIAZOLOPYRIMIDINE DERIVATIVES AND PREPARATION THEREOF

Real Laliberte, St. Laval, Quebec, Canada, assignor to Ayerst, McKenna and Harrison Limited, St. Laurent, Quebec, Canada
No Drawing. Filed Oct. 24, 1969, Ser. No. 869,322
Int. Cl. C07d 51/46
U.S. Cl. 260—251                                   13 Claims

ABSTRACT OF THE DISCLOSURE

Disclosed herein are 2,3,5a,6,7,8,9,9a-octahydro-9a-hydroxycyclopenta[4,5]pyrimidino[2,1-b]benzothiazol-11(1H)-one,
2,3,7,8-tetrahydro-3-hydroxy-2-methylcyclopenta[d]thiazolo[3,2-a]pyrimidin-5(6H)-one,
2,3,7,8-tetrahydro-3-hydroxy-3-ethylcyclopenta[d]thiazolo[3,2-a]pyrimidin-5(6H)-one,
2,3,6,7,8,8a-hexahydro-8a-hydroxy-5aH-cyclopenta[d]cyclopenta[4,5]thiazolo[3,2-a]pyrimidin-10(1H)-one,
5a,6,7,8,9,9a-hexahydro-9a-hydroxy-3-methyl-1H-pyrimido[2,1-b]benzothiazol-1-one,
2,3-dihydro-3-hydroxy-3,7-dimethyl-5H-thiazolo[3,2-a]pyrimidin-5-one,
3-ethyl-2,3-dihydro-3-hydroxy-7-methyl-5H-thiazolo[3,2-a]pyrimidin-5-one,
2,3,3a,9a-tetrahydro-9a-hydroxy-6-methyl-1H,8H-cyclopenta[4,5]thiazolo[3,2-a]pyrimidin-8-one,
5a,6,7,8,9,9a-hexahydro-9a-hydroxy-1H-pyrimido[2,1-b]benzothiazol-1-one,
2,3-dihydro-3-hydroxy-3-methyl-5H-thiazolo[3,2-a]pyrimidin-5-one,
3-ethyl-2,3-dihydro-3-hydroxy-5H-thiazolo[3,2-a]pyrimidin-5-one, and
2,3,3a,9a-tetrahydro-9a-hydroxy-1H,8H-cyclopenta[4,5]thiazolo-[3,2-a]pyrimidin-8-one.

The compounds have anti-inflammatory activity. The methods for their preparation and use are also disclosed.

BACKGROUND OF THE INVENTION

This invention relates to new and useful thiazolopyrimidine derivatives and to a process for their preparation.

The new thiazolopyrimidine derivatives of this invention possess useful pharmacological properties. For example, these derivatives exhibit anti-inflammatory activity at dose levels which afford protective effects without deleterious side effects, and this renders the compounds of this invention useful for the treatment of inflammatory conditions.

SUMMARY OF THE INVENTION

The thiazolopyrimidine derivatives of this invention may be represented by general Formula I

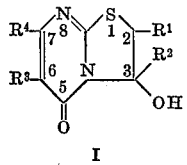

I in which $R^1$ represents hydrogen and $R^2$ represents a lower alkyl group containing one to six carbon atoms, such as, for example, methyl or ethyl group, or $R^1$ and $R^2$ together represent a polymethylene radical containing three to four carbon atoms joined to the 2 and 3 position of the thiazolopyrimidine ring to form an alicyclic ring, such as a trimethylene radical or a tetramethylene radical forming a cyclopentane or cyclohexane ring, respectively; $R^3$ represents hydrogen and $R^4$ represents hydrogen or a lower alkyl group containing one to six carbon atoms, such as for example, a methyl group, or $R^3$ and $R^4$ together represent a polymethylene radical containing three to four carbon atoms joined to the 6 and 7 positions of the thiazolopyrimidine ring to for an alicyclic ring, such as for example, a trimethylene radical forming a cyclopentane ring.

DETAILED DESCRIPTION OF THE INVENTION

The thiazolopyrimidines of this invention of general Formula I exhibit utility as anti-inflammatory agents. This anti-inflammatory property may be readily demonstrated in standard pharmacologic tests, for example, the tests similar to those described by Robert A. Turner in "Screening Methods in Pharmacology," Academic Press, p. 152, 1965; based on the reduction of pedal inflammation.

When the thiazolopyrimidine derivatives of this invention are employed as anti-inflammatory agents in warm-blooded animals, e.g., rats, dogs, or horses they may be administered orally, alone or in tablets combined with pharmacologically acceptable excipients, such as starch, milk, sugar and so forth. They may also be administered orally or parenterally in the form of solutions in pharmaceutically acceptable vehicles such as described, for example, in Remingtons' Practice of Pharmacy, 12th edition, Mack Publishing Company, Easton, Pa., 1961.

The dosage of the thiazolopyrimidine derivatives of this invention will vary with the particular compound chosen and form of administration. Furthermore, it will vary with the particular host under treatment. Generally, the compounds of this invention are administered at a concentration level that affords protective effects without any deleterious side effects. These effective concentration levels are usually obtained with a therapeutic range of 1 mg. to 100 mg. per kilo per day, with a preferred range of 5 mg. to 25 mg. per kilo per day.

To prepare the thiazolopyrimidine derivatives of this invention I prefer to use the process illustrated as follows:

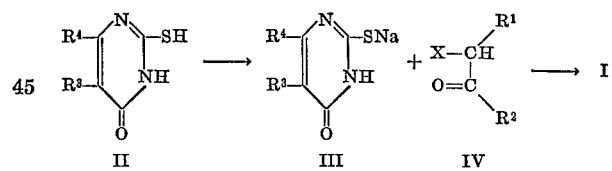

in which $R^1$, $R^2$, $R^3$ and $R^4$ are as described above and X represents a bromine or chlorine atom.

When preparing the compounds of this invention according to the foregoing process, I prefer to use as starting materials, the following 2-thiopyrimidine derivatives of Formula II: 2-thiouracil (II, $R^3=R^4=H$) described by H. L. Wheeler and L. M. Liddle, Am. Chem. J., 40, 550 (1908); 2-thio-6-methyluracil (II, $R^3=H$ and $R^4=CH_3$) described by H. M. Foster and H. R. Snyder, Organic Synthesis, 35, 80 (1955); and 1,5,6,7-tetrahydro-2-thio-2H-cyclopentapyrimidine-2,4(3H)-dione (II, $R^3$ and $R^4$ together=—$CH_2CH_2CH_2$—) described by S. Senda and H. Fujimura, Jap. Pat. No. 4892 ('62), Chem. Abstr., 59, 642 (1963).

In practising the above process, the starting material of Formula II is mixed with a solution of an alkali metal lower alkoxide containing one to five carbon atoms in a lower alkanol containing one to five carbon atoms to yield the corresponding alkali metal salt of the starting material. A convenient manner for accomplishing this salt formation is to add the starting material of Formula II to an excess of the alkali metal alkoxide, sodium ethoxide, in ethanol solution at room temperature. Under these conditions the starting material of Formula II is converted readily to the corresponding sodium salt of Formula III. Usually, a reaction time of five minutes is sufficient to ensure complete salt formation.

Following the formation of the above corresponding salt, the reaction mixture is treated with a α-bromo- or α-chloro-ketone of Formula IV for a period of one to 24 hours at temperatures ranging from room temperature to the boiling point of the mixture. Subsequently the reaction mixture is rendered acidic and the thiazolopyrimidine derivatives of this invention of Formula I are isolated either by filtration or by extraction. More specifiallly, a convenient manner by which this last step of the process may be performed is to treat the above reaction mixture of the sodium salt of Formula III with one to two equivalents of a commercially available α-chloro-ketone of Formula IV, 1-chloro-2-propanone, 1-chloro-2-butanone, 2-chlorocyclopentanone or 2-chlorocyclohexanone. The reaction mixture is subjected to reflux for about three hours, cooled, and rendered acidic with acetic acid. The precipitated product, a thiazolopyrimidine of this invention, is readily isolated and purified by standard laboratory procedures.

The following examples will illustrate this invention.

EXAMPLE 1

To a 250 cc., three necked, round bottomed flask, fitted with a mechanical stirrer, a condenser and a dropping funnel, 0.086 mole of sodium in 200 ml. of ethanol and 0.047 mole of 1,5,6,7-tetrahydro-2-thio-2H-cyclopenta-pyrimidine-2,4(3H)-dione are added. The solution is heated on a steam bath for five minutes, then 0.09 mole of 2-chlorocyclohexanone is added dropwise through the dropping funnel with constant stirring. The mixture is refluxed for three hours to give a yellow solution which is cooled and acidified with acetic acid. The mixture is evaporated to dryness to give a yellow oil, which, on addition of ethyl acetate, gives a white solid which is filtered off and washed several times with water. The ethyl acetate is evaporated to dryness to give a white solid. The two solids are combined and crystallized from methylcyclohexane to yield 2,3,5a,6,7,8,9,9a-octahydro-9a-hydroxy-cyclopenta[4,5]pyrimidino[2,1-b]benzothiazol - 11(1H)-one (I; $R^1$ and $R^2$ together=—$CH_2CH_2CH_2CH_2$—, $R^3$ and $R^4$ together=—$CH_2CH_2CH_2$—), M.P. 151–153° C., $\lambda_{max.}^{EtOH}$ 240 mμ (ε=7800) and 290 mμ (ε=7390), $\gamma_{max.}^{CHCl_3}$ 3380, 1650 cm.$^{-1}$ In the same manner but using an equivalent amount of 1-chloro-2-propanone, 1-chloro-2-butanone or 2-chloro-cyclopentanone, 2,3,7,8 - tetrahydro-3-hydroxy-3-methyl-cyclopenta[d]thiazolo[3,2 - a]pyrimidin - 5(6H)-one, (I; $R^1$=H, $R^2$=$CH_3$, $R^3$ and $R^4$ together=$CH_2CH_2CH_2$—), M.P. 121–123° C., 2,3,7,8-tetrahydro-3-hydroxy-3-ethyl-cyclopenta[d]thiazolo[3,2-]pyrimidin-5(6H)-one (I; $R^1$=H, $R^2$=$C_2H_5$, $R^3$ and $R^4$ together=—$CH_2CH_2CH_2$—) and 2,3,6,7,8,8a - hexahydro-8a-hydroxy-5aH-cyclopenta[4,5]thiazolo[3,2-a]pyrimidin-10(1H)-one (I; $R^1$ and $R^2$ together=—$CH_2CH_2CH_2$— and $R^3$ and $R^4$ together=—$CH_2CH_2CH_2$—), are obtained, respectively.

EXAMPLE 2

Following the precedure of Example 1 but substituting an equivalent amount of 2-thio-6-methyluracil for 1,5,6,7-tetrahydro-2-thio - 2H - cyclopentapyrimidine-2,4(3H)-dione, 5a,6,7,8,9,9a-hexahydro-9a-hydroxy - 3 - methyl-1H-pyrimido[2,1-b]benzothiazol - 1- one (I; $R^1$ and $R^2$ together=—$CH_2CH_2CH_2CH_2$—), $R^3$=H and $R^4$=$CH_3$), M.P. 121–122° C., $\lambda_{max.}^{EtOH}$ 234 mμ (ε=4,540) and 290 mμ (ε=4,870)

is obtained.

In the same manner but using an equivalent amount of 1-chloro-2-propanone, 1-chloro - 2 - butanone or 2-chlo-rocyclopentanone instead of 2-chlorocyclohexanone, 2,3-dihydro - 3 - hydroxy - 3,7 - dimethyl-5H-thiazolo[3,2-a]pyrimidin-5-one (I; $R^1$ and $R^3$=H, $R^2$ and $R^4$=$CH_3$), 3-ethyl-2,3-dihydro-3-hydroxy - 7 - methyl-5H-thiazolo-[3,2-a]pyrimidin-5-one (I; $R^1$ and $R^3$=H, $R^2$=$C_2H_5$ and $R^4$=$CH_3$) and 2,3,3a,9a - tetrahydro - 9a - hydroxy-6-methyl - 1H,8H - cyclopenta[4,5]thiazolo[3,2-a]pyrimidin-8-one (I; $R^1$ and $R^2$ together=—$CH_2CH_2CH_2$—, $R^3$=H and $R^4$=$CH_3$), M.P. 143–144° C.

$\gamma_{max.}^{EtOH}$ 237 mμ (ε=7300) and 292 mμ (ε=7700)

are obtained, respectively.

EXAMPLE 3

Following the procedure of Example 1 but substituting an equivalent amount of 2-thiouracil for 1,5,6,7-tetrahydro-2-thio - 2H - cyclopentapyrimidine - 2,4(3H) - dione, 5a,6,7,8,9,9a-hexahydro - 9a - hydroxy - 1H - pyrimido-[2,1-b]benzothiazol - 1 - one (I; $R^1$ and $R^2$ together =—$CH_2CH_2CH_2CH_2$—, $R^3$ and $R^4$=H) is obtained, $\lambda_{max.}^{CHCl_3}$ 1652 cm.$^{-1}$ In the same manner but using an equivalent amount of 1-chloro-2-propanone, 1-chloro-2-butanone or 2-chloro-cyclopentanone instead of 2-chlorocyclohexanone, 2,3-dihydro-3-hydroxy-3-methyl - 5H - thiazolo[3,2-a]pyrimidin-5-one (I; $R^1$, $R^3$ and $R^4$=H, and $R^2$=$CH_2$), 3-ethyl-2,3-dihydro-3-hydroxy - 5H - thiazolo[3,2-a]pyrimidin-5-one (I; $R^1$, $R^3$ and $R^4$=H, and $R^2$=$C_2H_5$) and 2,3,3a,9a-tetrahydro-9a-hydroxy - 1H,8H - cyclopenta[4,5]thiazolo-[3,2 - a]pyrimidin - 8 - one (I; $R^1$ and $R^2$ together= —$CH_2CH_2CH_2$—, and $R^3$ and $R^4$=H) are obtained, respectively.

I claim:
1. A thiazolopyrimidine derivative selected from those of the formula

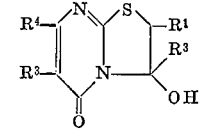

wherein $R^1$ represents hydrogen and $R^2$ represents lower alkyl containing from one to six carbon atoms; or $R^1$ and $R^2$ together represent a polymethylene radical containing from three to four carbon atoms joined to the 2 and 3 positions of the thiazolopyrimidine ring to form an alicyclic ring; $R^3$ represents hydrogen and $R^4$ represents hydrogen or a lower alkyl containing from one to six carbon atoms; or $R^3$ and $R^4$ together represent a polymethylene radical containing from three to four carbon atoms joined to the 6 and 7 positions of the thiazolopyrimidine ring to form an alicyclic ring.

2. 2,3,5a,6,7,8,9a - octahydro - 9a - hydroxy - cyclopenta[4,5]pyrimidino[2,1-b]benzothiazol - 11(1H) - one, as claimed in claim 1.

3. 2,3,7,8 - tetrahydro - 3 - hydroxy - 3 - methyl-cyclopenta[d]thiazol[3,2-a]pyrimidin - 5(6H) - one, as claimed in claim 1.

4. 2,3,7,8 - tetrahydro- 3 - hydroxy - 3 - ethylcyclo-penta[d]thiazolo-[3,2-a]pyrimidin-5(6H)-one, as claimed in claim 1.

5. 2,3,6,7,8,8a - hexahydro - 8a - hydroxy - 5aH - cyclopenta[d]cyclopenta[4,5]thiazolo[3,2 - a]pyrimidin - 10-(1H)-one, as claimed in claim 1.

6. 5a,6,7,8,9,9a - hexahydro-9a - hydroxy-3-methyl-1H-pyrimido[2,1-b]benzothiazol-1-one, as claimed in claim 1.

7. 2,3 - dihydro - 3 - hydroxy - 3,7 - dimethyl-5H-thiazolo[3,2-a]pyrimidin-5-one, as claimed in claim 1.

8. 3 - ethyl - 2,3 - dihydro - 3 - hydroxy - 7 - methyl-5H-thiazolo[3,2-a]pyrimidin-5-one, as claimed in claim 1.

9. 2,3,3a,9a - tetrahydro - 9a - hydroxy-6-methyl-1H, 8H-cyclopenta[4,5]thiazolo[3,2-a]pyrimidin - 8 - one, as claimed in claim 1.

10. 5a,6,7,8,9,9a - hexahydro - 9a - hydroxy-1H-pyrimido[2,1-b]benzothiazol-1-one, as claimed in claim 1.

11. 2,3-dihydro - 3 - hydroxy - 3 - methyl-5H-thiazolo-[3,2-a]pyrimidin-5-one, as claimed in claim 1.

12. 3-ethyl - 2,3 - dihydro - 3 - hydroxy-5H-thiazolo-[3,2-a]pyrimidine-5-one, as claimed in claim 1.

13. 2,3,3a,9a - tetrahydro - 9a - hydroxy-1H,8H-cyclopenta[4,5]thiazolo[3,2-a]pyrimidin-8-one, as claimed in claim 1.

References Cited

UNITED STATES PATENTS

| 3,507,868 | 4/1970 | Manning | 260—251 |
|---|---|---|---|
| 3,507,869 | 4/1970 | Houlihan et al. | 260—251 |

ALEX MAZEL, Primary Examiner

R. V. RUSH, Assistant Examiner

U.S. Cl. X.R.

424—251

PO-1050
(5/69)

UNITED STATES PATENT OFFICE
CERTIFICATE OF CORRECTION

Patent No. 3,594,378      Dated July 20, 1971

Inventor(s) Real Laliberte

It is certified that error appears in the above-identified patent and that said Letters Patent are hereby corrected as shown below:

Column 4, Claim 1, line 40, the "$R^3_2$" attached to the thiazole ring moiety should be -- $R^2$ -- so that the formula should read:

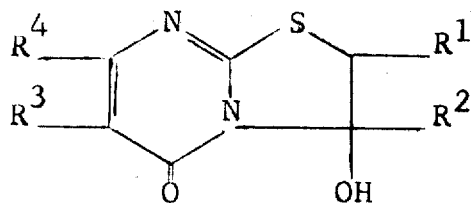

Column 4, Claim 7, line 1, the word "dimehyl" should read -- dimethyl --

Signed and sealed this 25th day of January 1972.

(SEAL)
Attest:

EDWARD M. FLETCHER, JR.
Attesting Officer

ROBERT GOTTSCHALK
Commissioner of Patents